United States Patent
Liu et al.

(10) Patent No.: US 11,443,069 B2
(45) Date of Patent: Sep. 13, 2022

(54) ROOT CAUSE ANALYSIS OF VULNERABILITY OF NEURAL NETWORKS TO ADVERSARIAL EXAMPLES

(71) Applicant: International Business Machines Corporation, Armonk, NY (US)

(72) Inventors: Sijia Liu, Somerville, MA (US); Quanfu Fan, Lexington, MA (US); Gaoyuan Zhang, Medford, MA (US); Chuang Gan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 16/559,161

(22) Filed: Sep. 3, 2019

(65) Prior Publication Data
US 2021/0064785 A1    Mar. 4, 2021

(51) Int. Cl.
*G06F 21/71*     (2013.01)
*G06F 21/57*     (2013.01)
*G06N 20/00*    (2019.01)

(52) U.S. Cl.
CPC ............ *G06F 21/71* (2013.01); *G06F 21/577* (2013.01); *G06N 20/00* (2019.01); *G06F 2221/034* (2013.01)

(58) Field of Classification Search
CPC .. G06F 21/71; G06F 21/577; G06F 2221/034; G06F 21/554; G06N 20/00; G06N 5/045; G06N 3/0454; G06N 3/08
See application file for complete search history.

(56) References Cited

U.S. PATENT DOCUMENTS

| | | | |
|---|---|---|---|
| 11,205,028 B2 * | 12/2021 | Albert | G06F 30/27 |
| 2019/0130110 A1 | 5/2019 | Lee et al. | |
| 2020/0167471 A1 * | 5/2020 | Rouhani | G06N 7/005 |
| 2020/0285952 A1 * | 9/2020 | Liu | G06N 3/08 |
| 2020/0389371 A1 * | 12/2020 | Tedaldi | H04L 45/64 |
| 2021/0056404 A1 * | 2/2021 | Goswami | G06V 10/82 |

FOREIGN PATENT DOCUMENTS

CN    107977707 A    5/2018

OTHER PUBLICATIONS

Simon-Gabriel et al., "First-Order Adversarial Vulnerability of Neural Networks an Input Dimension", 36th International Conference on Machine Learning (ICML), Jun. 16, 2019, 20 pages, https://arxiv.org/pdf/1802.01421v4.pdf.

(Continued)

*Primary Examiner* — Joseph P Hirl
*Assistant Examiner* — Thomas A Gyorfi
(74) *Attorney, Agent, or Firm* — Daniel Morris; Otterstedt & Kammer PLLC

(57) ABSTRACT

An illustrative embodiment includes a method for protecting a machine learning model. The method includes: determining concept-level interpretability of respective units within the model; determining sensitivity of the respective units within the model to an adversarial attack; identifying units within the model which are both interpretable and sensitive to the adversarial attack; and enhancing defense against the adversarial attack by masking at least a portion of the units identified as both interpretable and sensitive to the adversarial attack.

20 Claims, 21 Drawing Sheets
(19 of 21 Drawing Sheet(s) Filed in Color)

(56) References Cited

OTHER PUBLICATIONS

Kugler et al., "Exploring Adversarial Examples—Patterns of One-Pixel Attacks", First International Workshop on Deep Learning Fails (DLF), Understanding and Interpreting Machine Learning in Medical Image Computing Applications, Lecture Notes in Computer Science (LNCS) 11038, Sep. 2018, pp. 70-78, https://link.springer.com/chapter/10.1007%2F978-3-030-02628-8_8.

Xiao et al., "Generating Adversarial Examples with Adversarial Networks", Proceedings of the Twenty-Seventh International Joint Conference on Artificial Intelligence (IJCAI-18), Jul. 2018, pp. 3905-3911, https://www.ijcai.org/proceedings/2018/0543.pdf.

Goodfellow et al., "Explaining and Harnessing Adversarial Examples", International Conference on Learning Representations (ICLR) 2015, Mar. 2015, 11 pages, https://arxiv.org/pdf/1412.6572v3.pdf.

Dong et al., "Towards Interpretable Deep Neural Networks by Leveraging Adversarial Examples", Aug. 2017, 12 pages, https://arxiv.org/pdf/1708.05493v1.pdf.

Carter et al., "Exploring Neural Networks with Activation Atlases", Distill, Mar. 6, 2019, https://distill.pub/2019/activation-atlas, 10 pages.

Papernot et al., "The Limitations of Deep Learning in Adversarial Settings", 2016 IEEE European Symposium on Security and Privacy (EuroS&P), Mar. 2016, pp. 372-387, https://ieeexplore.ieee.org/document/7467366.

Xu et al., "Structured Adversarial Attack: Towards General Implementation and Better Interpretability", International Conference on Learning Representations (ICLR) 2019, Feb. 19, 2019, 21 pages, https://arxiv.org/pdf/1808.01664v3.pdf.

Bau et al., "Network dissection: Quantifying interpretability of deep visual representations", Proceedings of the 2017 IEEE Conference on Computer Vision and Pattern Recognition, Jul. 2017, pp. 6541-6549, http://openaccess.thecvf.com/content_cvpr_2017/papers/Bau_Network_Dissection_Quantifying_CVPR_2017_paper.pdf.

Carlini & Wagner, "Towards evaluating the robustness of neural networks", 2017 IEEE Symposium on Security and Privacy (SP), May 2017, pp. 39-57, https://ieeexplore.ieee.org/abstract/document/7958570.

Madry et al., "Towards Deep Learning Models Resistant to Adversarial Attacks", Nov. 2017, 27 pages, https://arxiv.org/pdf/1706.06083v3.pdf.

Kurakin et al., "Towards Deep Learning Models Resistant to Adversarial Attacks", International Conference on Learning Representations (ICLR) 2017, Feb. 2017, 17 pages, https://arxiv.org/pdf/1611.01236v2.pdf.

Chen et al., "EAD: Elastic-Net Attacks to Deep Neural Networks via Adversarial Examples", Thirty-Second AAAI Conference on Artificial Intelligence, Feb. 2018, pp. 10-17, https://aaai.org/ocs/index.php/AAAI/AAAI18/paper/view/16893/15665.

Bau et al., "GAN Dissection: Visualizing and Understanding Generative Adversarial Networks", International Conference on Learning Representations (ICLR) 2019, Feb. 22, 2019, 19 pages, https://openreview.net/pdf?id=Hyg_X2C5FX.

Carlini & Wagner, "Adversarial Examples Are Not Easily Detected: Bypassing Ten Detection Methods", Proceedings of the 10th ACM Workshop on Artificial Intelligence and Security (AISec'17), Nov. 2017, pp. 3-14, https://dl.acm.org/citation.cfm?id=3140444.

He et al., "Deep Residual Learning for Image Recognition", 2016 IEEE Conference on Computer Vision and Pattern Recognition (CVPR), Jun. 2016, pp. 770-778, https://www.cv-foundation.org/openaccess/content_cvpr_2016/papers/He_Deep_Residual_Learning_CVPR_2016_paper.pdf.

Krizhevsky, "Learning Multiple Layers of Features from Tiny Images", Apr. 2009, 60 pages, https://www.cs.toronto.edu/~kriz/learning-features-2009-TR.pdf.

Xu et al., "Interpreting Adversarial Examples by Activation Promotion and Suppression", Apr. 3, 2019, 16 pages, https://arxiv.org/pdf/1904.02057v1.pdf.

Xu et al., "Interpreting Adversarial Examples by Activation Promotion and Suppression", Apr. 3, 2019, 29 pages, https://www.groundai.com/project/interpreting-adversarial-examples-by-activation-promotion-and-suppression/.

Szegedy et al, "Rethinking the Inception Architecture for Computer Vision", 2016 IEEE Conference on Computer Vision and Pattern Recognition (CVPR), Jun. 2016, pp. 2818-2826, https://www.cv-foundation.org/openaccess/content_cvpr_2016/papers/Szegedy_Rethinking_the_Inception_CVPR_2016_paper.pdf.

Zhou et al., "Learning Deep Features for Discriminative Localization", 2016 IEEE Conference on Computer Vision and Pattern Recognition (CVPR), Jun. 2016, pp. 2921-2929, https://www.cv-foundation.org/openaccess/content_cvpr_2016/papers/Zhou_Learning_Deep_Features_CVPR_2016_paper.pdf.

\* cited by examiner

ROOT CAUSE ANALYSIS OF VULNERABILITY OF NEURAL NETWORKS TO ADVERSARIAL EXAMPLES

STATEMENT REGARDING PRIOR DISCLOSURES BY THE INVENTORS

Two versions of a paper by Xu et al. entitled "Interpreting Adversarial Examples by Activation Promotion and Suppression", dated Apr. 3, 2019 (hereinafter "Xu"), which is incorporated by reference herein in its entirety for all purposes, are submitted herewith and cited in an accompanying Information Disclosure Statement (IDS). Each of the named inventors of the present application is named as an author of the paper. The authors of the paper not named as inventors of the present application contributed to other portions of the paper, but the subject matter of Section 5 and Appendix 4/D—as well as the portions of Sections 1 and 2 directed to the network level—was invented only by the inventors of the present application. The paper was not published or otherwise made available to the public more than one year before the filing of the present application.

BACKGROUND

The present invention relates to the electrical, electronic and computer arts, and, more particularly, to improvements in security for machine learning applications.

Deep learning (i.e., artificial intelligence/machine learning using deep neural networks or DNNs) achieves exceptional successes with practical applications such as image recognition and classification, natural language processing (e.g., understanding, classification and/or translation), medical diagnostics, and advanced control, as well as security applications such as malware classification and facial recognition.

However, deep neural networks (including convolutional neural networks or CNNs) are vulnerable to adversarial attacks implemented by generating adversarial examples in which inputs are maliciously modified with pixel-level perturbations in a manner which may be imperceptible to humans but which can fool a classifier into reporting an incorrect prediction output (target label) with high confidence. Thus, adversarial examples are generally original, legal, and/or natural examples which have undergone an (often imperceptible) adversarial perturbation. Different types of adversarial attacks have been devised to mislead image classifiers with a high success rate.

Research on how to generate and defend against adversarial examples has received a lot of recent attention. However, understanding these attacks and further interpreting their adversarial effects has been less explored. Thus, many questions remain open with regard to how adversarial examples work, e.g., where and why a given neural network makes mistakes when facing adversarial examples.

SUMMARY

An illustrative embodiment includes a method for protecting a machine learning model. The method includes: determining concept-level interpretability of respective units within the model; determining sensitivity of the respective units within the model to an adversarial attack; identifying units within the model which are both interpretable and sensitive to the adversarial attack; and enhancing defense against the adversarial attack by masking at least a portion of the units identified as both interpretable and sensitive to the adversarial attack.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. Illustrative embodiments of the present invention provide a new method to localize neurons in DNNs which are sensitive to adversarial noise. Illustrative embodiments of the present invention provide a significance level (e.g., p-value) to answer whether or not the sensitive units exhibit strong concept-level interpretability. Illustrative embodiments of the present invention provide a visualization tool to identify sensitive and interpretable neurons, which contribute the most to a network's outcomes when facing adversarial perturbations. Illustrative embodiments of the present invention provide a new defense method, neuron masking, to mitigate the effect of adversarial attacks.

Illustrative embodiments of the present invention diagnose where and why a given neural network makes mistakes when facing adversarial examples. Illustrative embodiments provide a tool to localize the mistaken hidden units in neural networks (toward misclassification) while facing adversarial examples. Furthermore, illustrative embodiments provide a visual explanations that can identify the specific neurons and the specific concepts that cause a neural network's misbehavior, such as misclassification of an adversarial example.

Illustrative embodiments of the present invention analyze the effect of adversarial examples on internal response of neural networks (e.g., internal representations of CNNs), and provide interpretability and mitigation techniques from the network perspective. Illustrative embodiments of the present invention examine the effect of adversarial examples on the concept-level interpretability of hidden units within neural networks, thereby providing a deep understanding of the mechanism of adversarial attacks at the network level. Illustrative embodiments of the present invention provides an analysis which lies inside the network, e.g., at the network unit level, rather than the image space.

Illustrative embodiments of the present invention provide a sensitivity analysis of internal representations from the perspective of network interpretability, e.g., uncovering the interpretability of internal representations on semantic concepts. Illustrative embodiments of the present invention leverage a tight connection between the sensitivity of hidden units of CNNs (against attacks) with their interpretability on semantic concepts, which are also aligned with the promotion and suppression effect (PSE) of adversarial examples. Illustrative embodiments of the present invention also analyze how the internal representations of CNNs evolve with respect to adversarial inputs under both natural and robustly trained models. Thus, illustrative embodiments of the present invention mitigate the adversarial effects on the internal representations of CNNs. Illustrative embodiments analyze adversarial examples through network dissection, building the connection between the units' sensitivity to imperceptible perturbations and their interpretability on semantic concepts, then apply this analysis to designing effective defense methods, e.g., speeding up the adversarial training under interpretability priors.

These and other features and advantages of the present invention will become apparent from the following detailed description of illustrative embodiments thereof, which is to be read in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
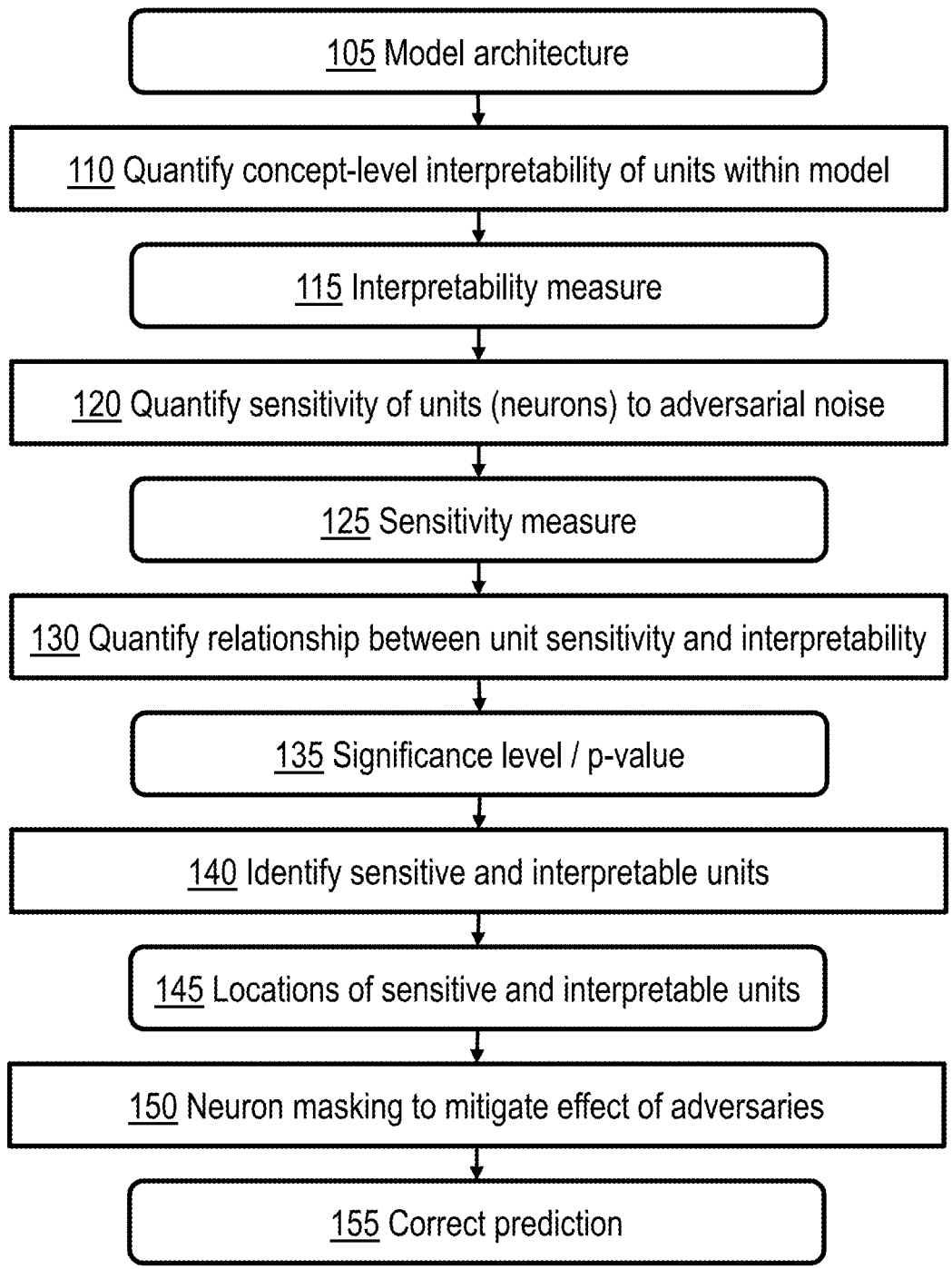
FIG. 1 is a flow diagram depicting a technique according to an illustrative embodiment of the invention.

As previously noted, adversarial examples are generally natural examples which have undergone an (often imperceptible) adversarial perturbation. Let $x_0 \in \mathbb{R}^n$ denote the natural image, and let $\delta$ be adversarial perturbations to be designed. Here, unless otherwise specified, the vector representation of an image is used. The adversarial example is then given by $x'=x_0+\delta$. By setting the input of CNNs as $x_0$ and $x'$, the classifier will predict the true label to and the target label t ($\neq t_0$), respectively.

To find minimal adversarial perturbations $\delta$ that are sufficient to predict the target label t, a norm-ball constrained attack technique may be used. Norm-ball constrained adversarial attacks seek to maximize the classification error subject to constraints on $l_p$-norm distortion between natural and adversarial examples, e.g., while minimizing the $l_p$ norm of adversarial perturbations. There are other attacks which craft adversarial examples by adding noise patches, but the resulting adversarial perturbations have increased noise visibility and may no longer be imperceptible to humans. Imperceptibility may help to understand how and/or why DNNs are vulnerable to adversarial attacks while perturbing natural examples just by undistinguished adversarial noise. Thus, although it is not a requirement of the invention, the illustrative embodiments described herein focus on imperceptible perturbations, and more particularly on norm-ball constrained adversarial attacks. Thus, illustrative embodiments of the present invention may visualize the effect of norm-ball constrained adversarial perturbations (rather than adversarial patches) and/or distinguish the effectiveness of various norm-ball constrained adversarial attacks.

As described in Xu at Section 2 and Appendix 1/A, examples of norm-ball constrained adversarial attacks include:

IFGSM described in, e.g., Goodfellow et al., "Explaining and Harnessing Adversarial Examples", International Conference on Learning Representations (ICLR) 2015, Mar. 2015, 11 pages, which is incorporated by reference herein in its entirety for all purposes, and Kurakin et al., "Towards Deep Learning Models Resistant to Adversarial Attacks", International Conference on Learning Representations (ICLR) 2017, Feb. 2017, 17 pages, which is incorporated by reference herein in its entirety for all purposes;

C&W described in, e.g., Carlini & Wagner, "Towards evaluating the robustness of neural networks", 2017 IEEE Symposium on Security and Privacy (SP), May 2017, pp. 39-57, which is incorporated by reference herein in its entirety for all purposes, and Carlini & Wagner, "Adversarial Examples Are Not Easily Detected: Bypassing Ten Detection Methods", Proceedings of the 10th ACM Workshop on Artificial Intelligence and Security (AISec'17), Nov. 2017, pp. 3-14, which is incorporated by reference herein in its entirety for all purposes;

EAD described in, e.g., Chen et al., "EAD: Elastic-Net Attacks to Deep Neural Networks via Adversarial Examples", Thirty-Second AAAI Conference on Artificial Intelligence, February 2018, pp. 10-17, which is incorporated by reference herein in its entirety for all purposes; and Str described in, e.g., Xu et al., "Structured Adversarial Attack: Towards General Implementation and Better Interpretability", International Conference on Learning Representations (ICLR) 2019, Feb. 19, 2019, 21 pages, which is incorporated by reference herein in its entirety for all purposes.

Adversarial examples at the network level may, for example, be generated from the Broadly and Densely Labeled Dataset (Broden), which contains examples with pixel-level concept annotations related to multiple concept categories including color, material, texture, part, scene, and object. See, e.g., Bau et al., "Network dissection: Quantifying interpretability of deep visual representations", Proceedings of the 2017 IEEE Conference on Computer Vision and Pattern Recognition, July 2017, pp. 6541-6549 (hereinafter "Bau"), the entirety of which is hereby incorporated by reference herein for all purposes. Different from other datasets, examples in Broden contain pixel-level concept annotation, ranging from low-level concepts such as color and texture to higher-level concepts such as material, part, object, and scene. Adversarial examples D' may be produced from natural examples within Broden dataset D, for example, using projected gradient descent (PGD) untargeted attacking method described in, e.g., Madry et al., "Towards Deep Learning Models Resistant to Adversarial Attacks", Nov. 2017, 27 pages (hereinafter "Madry"), the entirety of which is incorporated by reference herein for all purposes.

FIG. 1 is a flow diagram depicting a technique according to an illustrative embodiment of the invention. Technique 100 receives as input 105 a model architecture representing the structure of a neural network, e.g., a DNN and/or CNN. In an illustrative embodiment, the network model may be a residual network, such as ResNet_101 and/or ResNet_152, as described in, e.g., He et al., "Deep Residual Learning for Image Recognition", 2016 IEEE Conference on Computer Vision and Pattern Recognition (CVPR), June 2016, pp. 770-778, the entirety of which is incorporated by reference herein for all purposes. Additionally or alternatively, the network model may be Inception_V3 as described in, e.g., Szegedy et al, "Rethinking the Inception Architecture for Computer Vision," 2016 IEEE Conference on Computer Vision and Pattern Recognition (CVPR), June 2016, pp. 2818-2826, the entirety of which is incorporated by reference herein for all purposes.

Step 110 includes quantifying the interpretability of units within the model. As used herein, a unit generally refers to a channel-wide feature map. Step 110 results in output 115 of interpretability measure(s). Interpretability measured by network dissection refers to the alignment between individual hidden units and a set of semantic concepts, e.g., provided by Broden as described in Bau. Thus, network dissection may be used to build a correspondence between a hidden unit's activation and its interpretability on semantic concepts. More formally, the Interpretability of Unit (IoU) k with respect to the concept c is defined by $$IoU(k, c) = \frac{\sum_{x \in \mathcal{D}} |M_k(x) \cap L_c(x)|}{\sum_{x \in \mathcal{D}} |M_k(x) \cup L_c(x)|},$$

where $\mathcal{D}$ denotes the Broden dataset, and |·| is the cardinality of a set. $M_k$ is a binary segmentation of the activation map of unit k, which gives the representative region of x at k. Here the activation is scaled up to the input resolution using bilinear interpolation, denoted by $S_k(x)$, and then truncated using the top 5% quantile (dataset-level) threshold $T_k$. That is, $M_k(x)=S_k(x) \geq T_k$. $L_c(x)$ is the input-resolution annotation mask, provided by Broden, for the concept c with respect to x. Since one unit might be able to detect multiple concepts, the Interpretability of Unit (IoU) k is summarized as $IoU(k)=(1/|C|)\Sigma_c IoU(k, c)$, where |C| denotes the total number of concept labels.

Step 120 includes quantifying the sensitivity of units (neurons) to adversarial noise. Step 120 results in output 125 of sensitivity measure(s). Step 120 leverages network dissection to measure the effect of adversarial perturbations on the internal response of CNNs. Given adversarial examples $x' \in \mathcal{D}'$ corresponding to $x \in \mathcal{D}$, the sensitivity of unit k (to adversarial perturbations) may be characterized via the change of activation segmentation $v(k):=\mathbb{E}_{(x,x')}[\|M_k(x)-M_k(x')\|_2]$ where $\|a\|_2$ represents the L2 norm of the vector a; (x, x') is a pair of natural and adversarial examples; and the expectation is taken over a certain distribution of interest, e.g., the entire dataset or data of fixed source-target labels. Activation segmentation $M_k$ is used rather than the activation map $S_k$ since the former highlights the representative region of an activation map without inducing layer-wise magnitude bias.

Step 130 includes quantifying relationship between unit sensitivity and interpretability. Step 130 results in output 135 of a significance level, which may, e.g., a p-value (probability value). Given the per-unit sensitivity measure v(k) and interpretability measure IoU(k), step 130 includes determining whether or not the sensitive units (to adversarial perturbations) exhibit strong interpretability. Making this determination may involve conducting tests of statistical significance (in terms of p-value) by contrasting the IoU of the top N ranked sensitive units with the IoU distribution of randomly selected N units. Formally, the p-value is the probability of observing $\Sigma_k IoU(k)$ when k is from the top N sensitive units ranked by v(k) in the background IoU distribution of when N units are randomly picked. The smaller the p-value is, the more significant the connection between sensitivity and interpretability is.

Figure 2A:
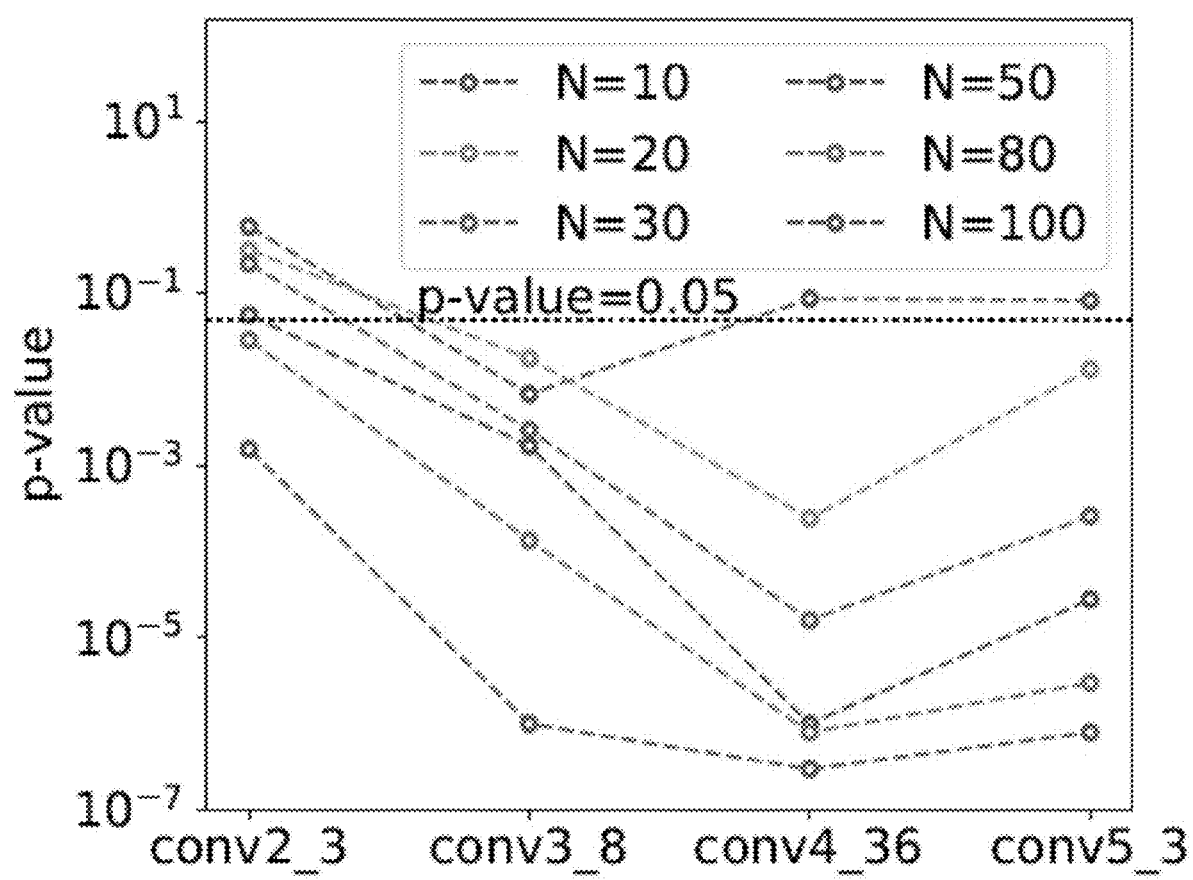
FIGS. 2A and 2B are graphs depicting experimental results for an illustrative embodiment of the invention.
Figure 2B:
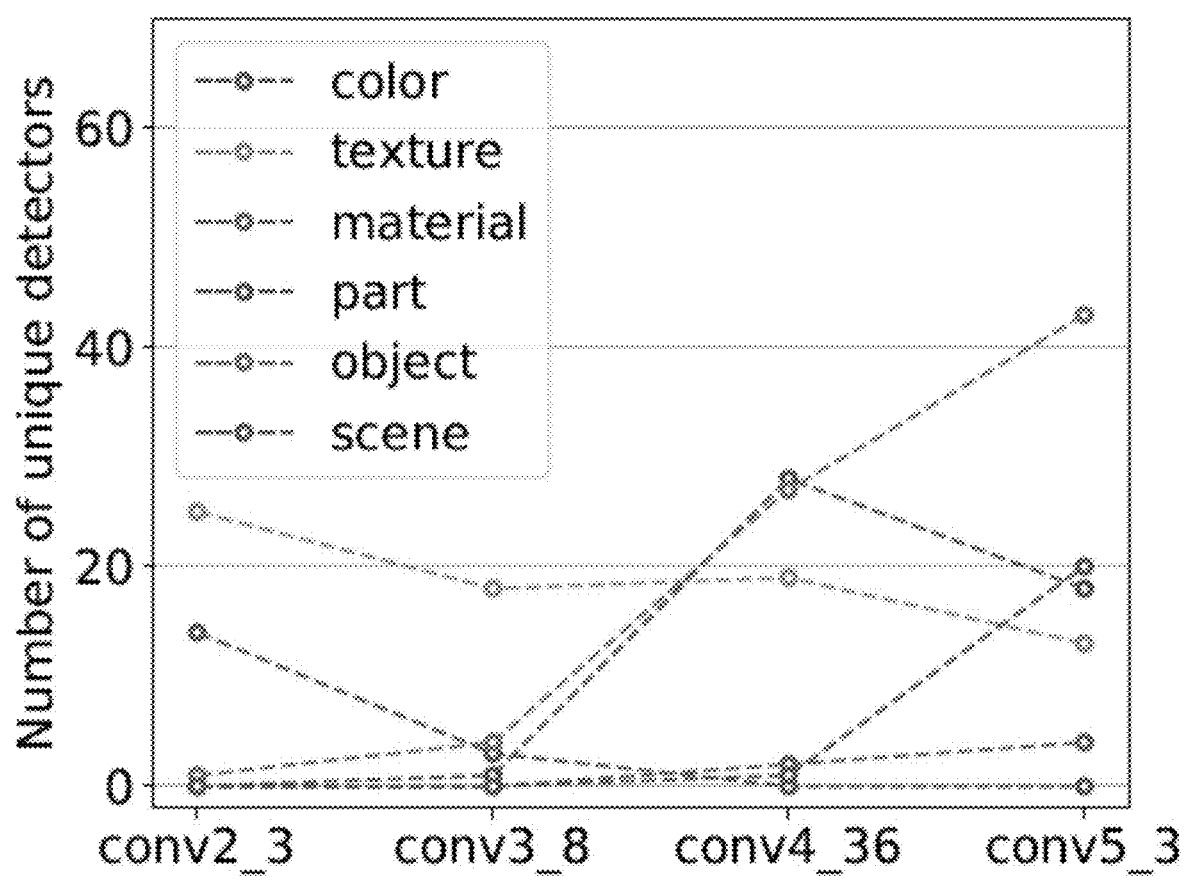

FIGS. 2A and 2B show experimental results generated using an illustrative embodiment of the invention. FIG. 2A shows the significance test (p-value) of the interpretability of top $N \in \{10, 20, 30, 50, 80, 100\}$ sensitive units against the layer index of ResNet_152, where the presented layers include conv2_3 (256 units), conv3_8 (512 units), conv4_36 (1024 units) and conv5_3 (2048 units), and where convi_j denotes the last convolutional layer of the j-th building block at the i-th layer of ResNet_152. FIG. 2A shows that there exists a strong connection between the sensitivity of units and their interpretability since p <0.05 in most cases.

Fixing the layer number shows that the connection between sensitivity and interpretability becomes more significant as N increases. This suggests that even if the most interpretable units are not precisely the most sensitive units, they still maintain high sensitivity with top 100 ranking. Fixing N shows that deep layers (conv4_36 and conv5_3) exhibit stronger connection between sensitivity and interpretability compared to shallow layers (conv2_3 and conv3_8). That is because the change of activation induced by adversarial attacks at shallow layers could be subtle and are less detectable in terms of interpretability.

FIG. 2B shows the number of concept detectors among the top N=100 sensitive units per layer for each concept category. As used herein, a concept detector generally refers to a unit with the top ranked concept satisfying maxc IoU(k, c)>0.04. FIG. 2B shows that more high-level concept detectors (e.g., object and part) emerge in conv4_36 and conv5_3 while low-level concepts (e.g., color and texture) dominate at lower layers.

Returning to FIG. 1, step 140 includes identifying sensitive and interpretable units. Step 140 results in output 145 of locations of sensitive and interpretable units. More particularly, step 140 may include localizing interpretable and sensitive units. Step 140 may result in output 145 of unit index and attention map with respect to the interpretable concept under either natural or adversarial input.

The impact of adversarial perturbations on individual images may be determined by examining how the representation of a concept detector is visualized by attacking images from the same true class to to the same target class t. Here the representation of a concept detector is visualized by the segmented input image, where $M_k(x)$ determines the segmentation corresponding to the top ranked concept.

FIGS. 3A-3E depict exemplary visualizations generated using an illustrative embodiment of the invention for a lamp-to-couch adversarial attack. More particularly, FIGS. 3A-3E show visualizations of the impact of original and adversarial examples on the response of concept detectors identified by network dissection at 4 representative layers in ResNet_152 for an adversarial attack with true class to "table lamp" and target class t "studio couch, day bed."

More particularly, each of the images in FIGS. 3A-3E depicts the response of concept detectors visualized by the segmented input image, where the segmentation is given by $M_k(x)$ corresponding to the top-ranked concept at each unit. In each of FIGS. 3A-3E, the upper row of images are original images identified as the true class "target lamp," and the lower row of images are adversarial images identified as the target class "studio couch, day bed."

Figure 3A:
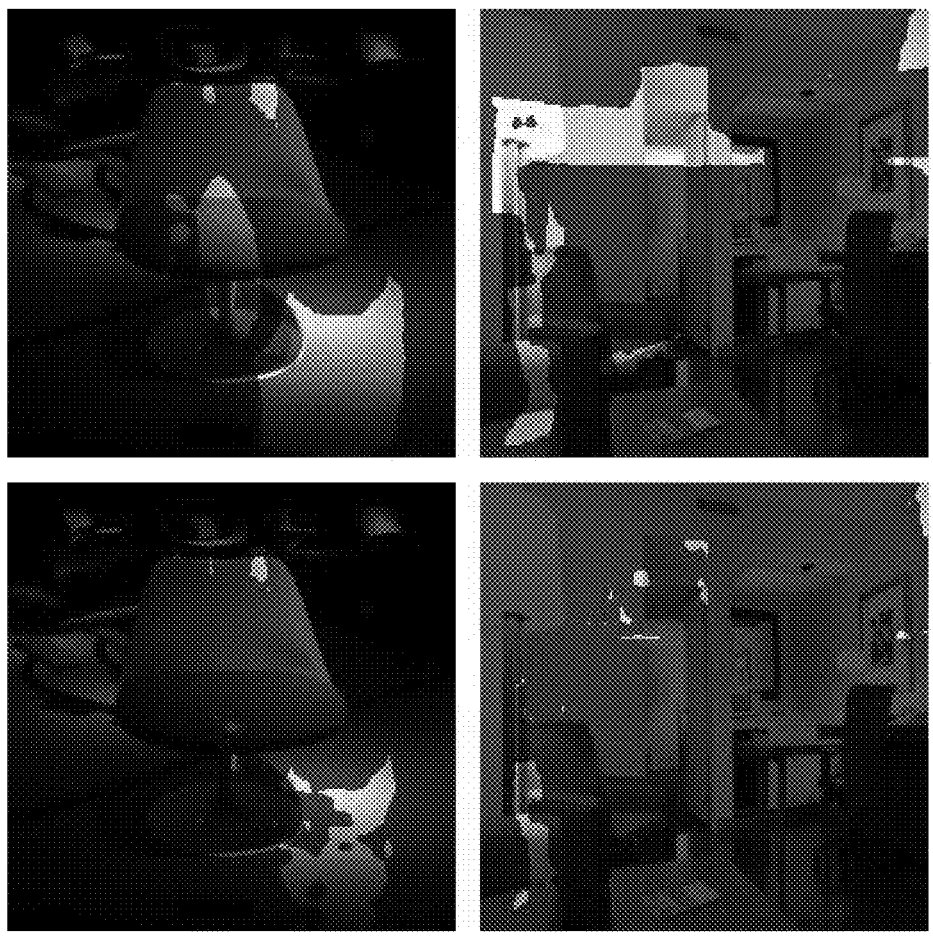
FIGS. 3A-3E depict exemplary visualizations generated using an illustrative embodiment of the invention for a lamp-to-couch adversarial attack.
Figure 3B:
Figure 3C:
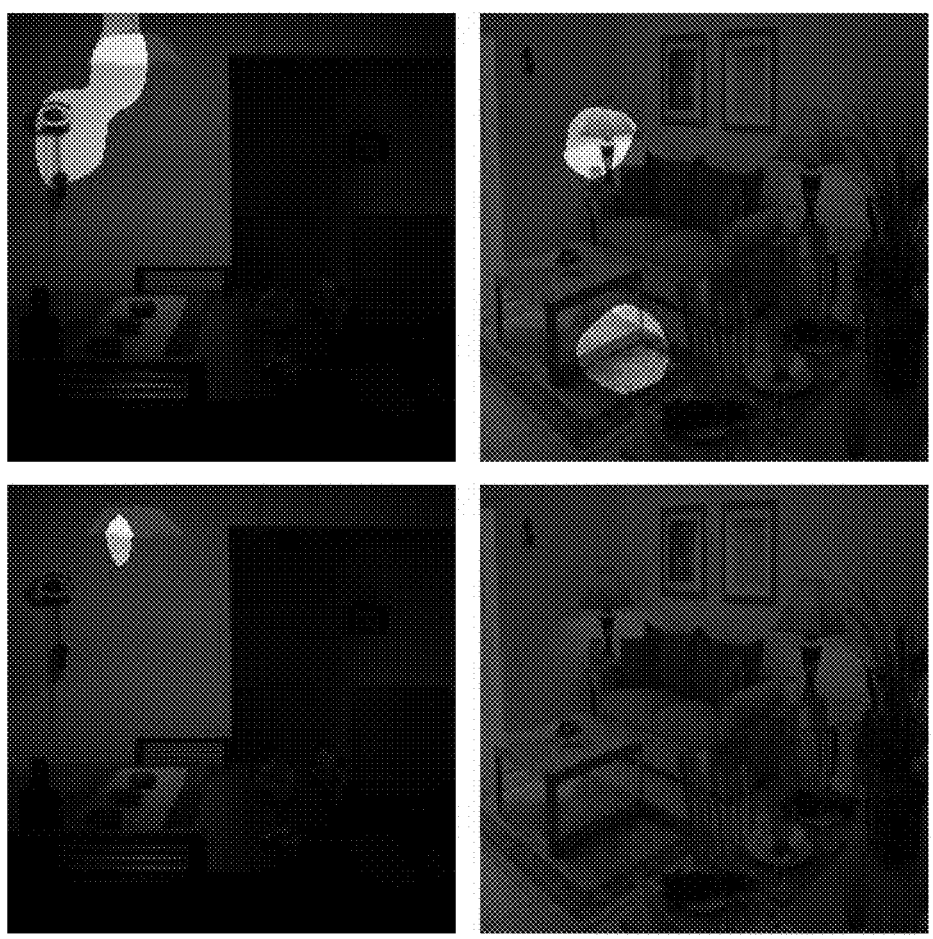
Figure 3D:
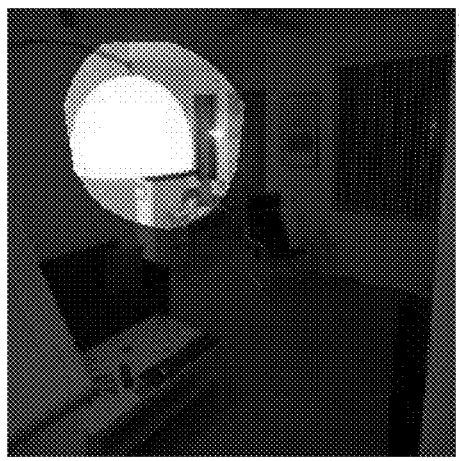
Figure 3D:
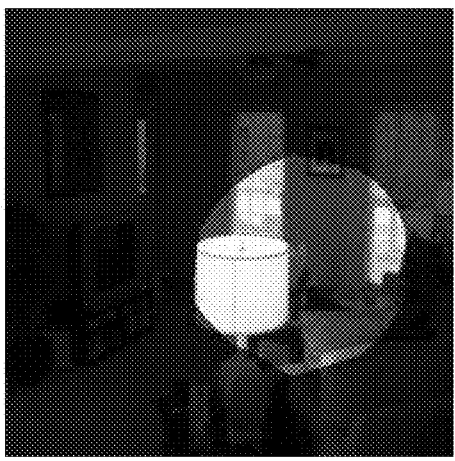
Figure 3D:
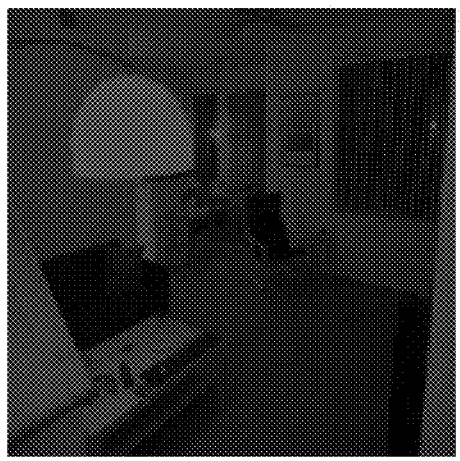
Figure 3D:
Figure 3E:
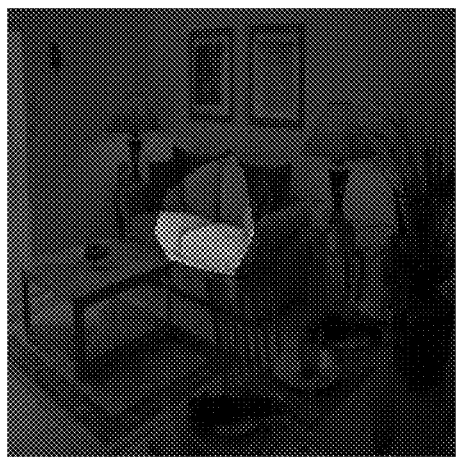
Figure 3E:
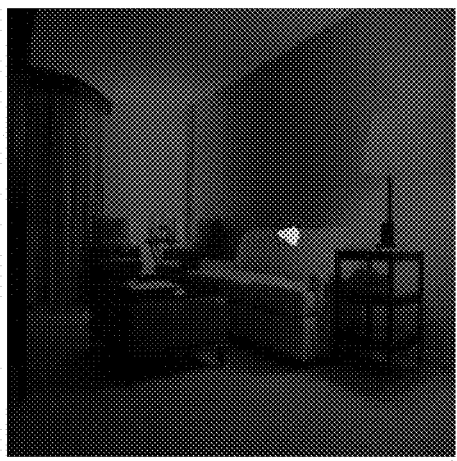
Figure 3E:
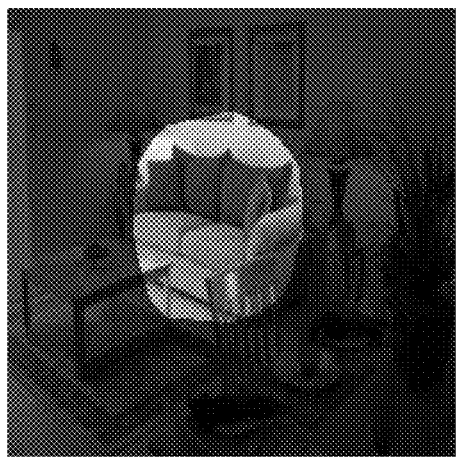
Figure 3E:
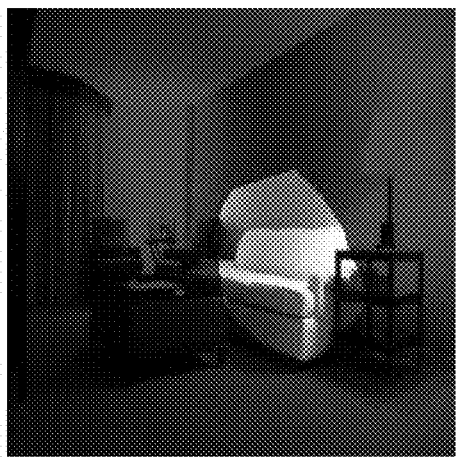

FIG. 3A shows results for the conv2_3 layer, including a unit index of 193 and the top-ranked concept having the label "orange" in the category "color." FIG. 3B shows results for the conv3_8 layer, including a unit index of 358 and the top-ranked concept having the label "flecked" in the category "texture." FIG. 3C shows results for the conv4_36 layer, including a unit index of 457 and the top-ranked concept having the label "shade" in the category "part." FIG. 3D shows results for the conv5_3 layer, including a unit index of 1716 and the top-ranked concept having the label "lamp" in the category "object." FIG. 3E shows results for the conv5_3 layer, including a unit index of 123 and the top-ranked concept having the label "sofa" in the category "object."

FIGS. 4A-4E depict exemplary visualizations generated using an illustrative embodiment of the invention for an airliner-to-seashore adversarial attack. More particularly, FIGS. 4A-4E show visualizations of the impact of original and adversarial examples on the response of concept detectors identified by network dissection at 4 representative layers in ResNet_152 for an adversarial attack with true class to "airliner" and target class t "seashore, coast, seacoast, sea-coast."

More particularly, each of the images in FIGS. 4A-4E depicts the response of concept detectors visualized by the segmented input image, where the segmentation is given by Mk(x) corresponding to the top-ranked concept at each unit. In each of FIGS. 4A-4E, the upper row of images are original images identified as the true class "airliner," and the lower row of images are adversarial images identified as the target class "seashore, coast, seacoast, sea-coast."

Figure 4A:
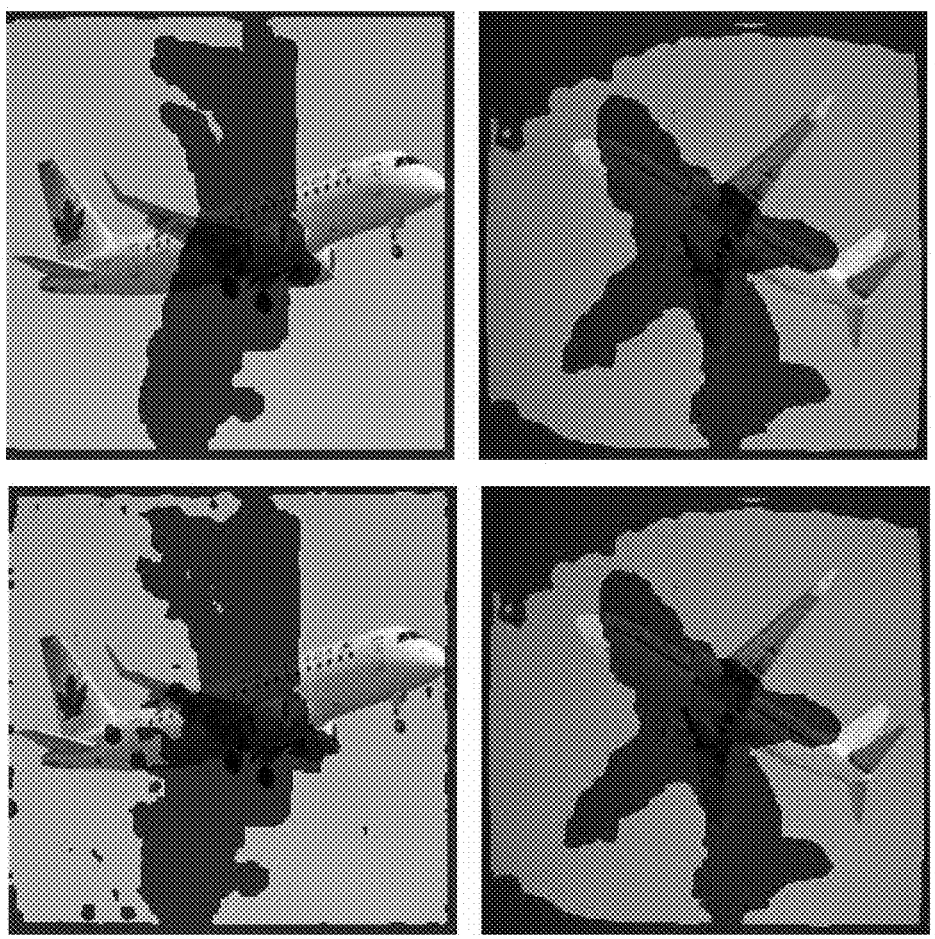
FIGS. 4A-4E depict exemplary visualizations generated using an illustrative embodiment of the invention for an airliner-to-seashore adversarial attack.
Figure 4B:
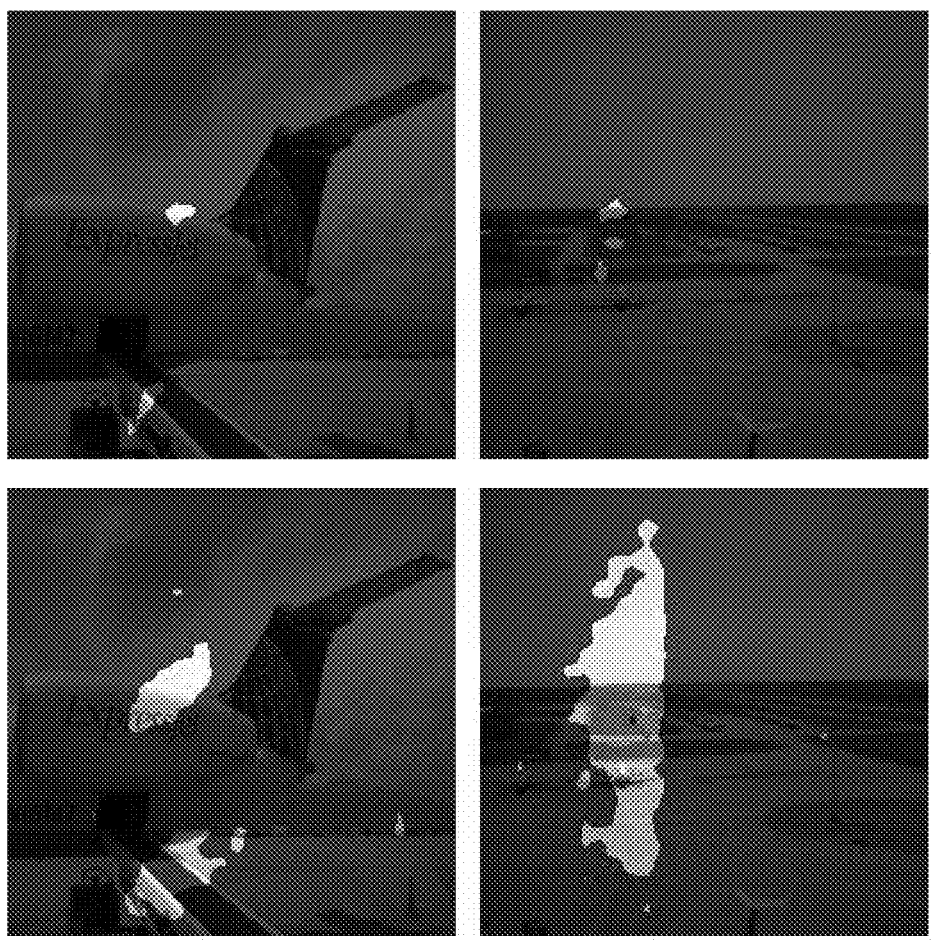
Figure 4C:
Figure 4D:
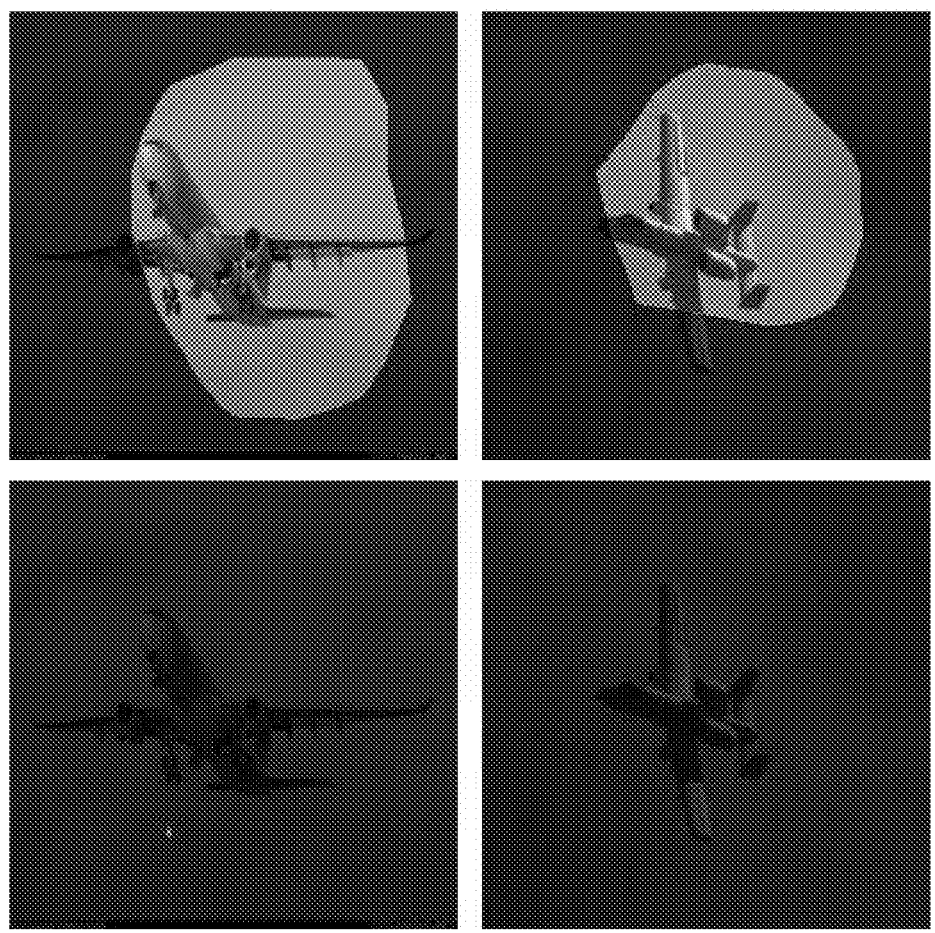
Figure 4E:
Figure 4E:
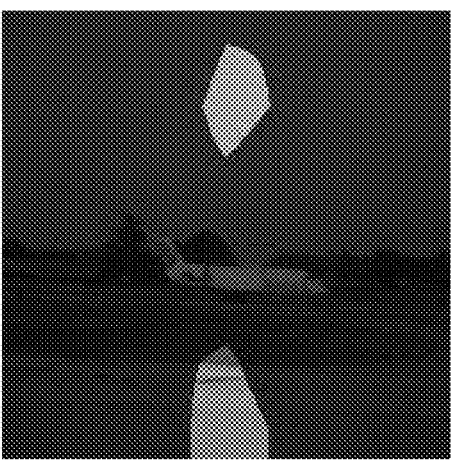
Figure 4E:
Figure 4E:
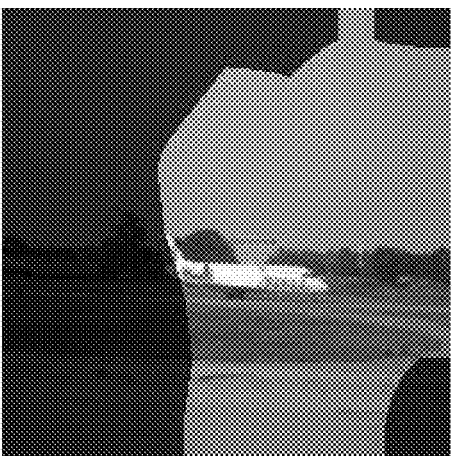

FIG. 4A shows results for the conv2_3 layer, including a unit index of 84 and the top-ranked concept having the label "blue" in the category "color." FIG. 4B shows results for the conv3_8 layer, including a unit index of 445 and the top-ranked concept having the label "banded" in the category "texture." FIG. 4C shows results for the conv4_36 layer, including a unit index of 2 and the top-ranked concept having the label "stern" in the category "part." FIG. 4D shows results for the conv5_3 layer, including a unit index of 781 and the top-ranked concept having the label "airplane" in the category "object." FIG. 4E shows results for the conv5_3 layer, including a unit index of 782 and the top-ranked concept having the label "beach" in the category "scene."

In FIGS. 3 and 4, most of the low-level concepts (e.g., color and texture) are detected at shallow layers, which is consistent with FIG. 2B discussed above. In FIG. 3A for the lamp-to-couch attack at layer conv2_3, the color "orange" is less expressed for the adversarial image(s) than for the natural image(s). This aligns with human perception since "orange" is related to "light" and thus "table lamp." By contrast, in FIG. 4A for the airliner-to-seashore attack at layer conv2_3, the color "blue" is well detected in both natural and adversarial images, since "blue" is associated with both "sky" for "airliner" and "sea" for "seashore."

In FIGS. 3 and 4, high-level concepts (e.g., part and object) are detected at shallow layers, which is consistent with FIG. 2B discussed above. At conv5_3, the expression of object concepts relevant to the true label (e.g., lamp in FIG. 3D and airplane in FIG. 4D) is suppressed, while the expression of object concepts relevant to the target label (e.g., sofa in FIG. 3E and beach in FIG. 4E) is promoted. This precisely reflects the activation promotion and suppression effect induced by adversarial perturbations.

Figure 5A:
FIG. 5A depicts further visualizations generated using an illustrative embodiment of the invention for the lamp-to-couch adversarial attack of FIG. 3.
Figure 5B:
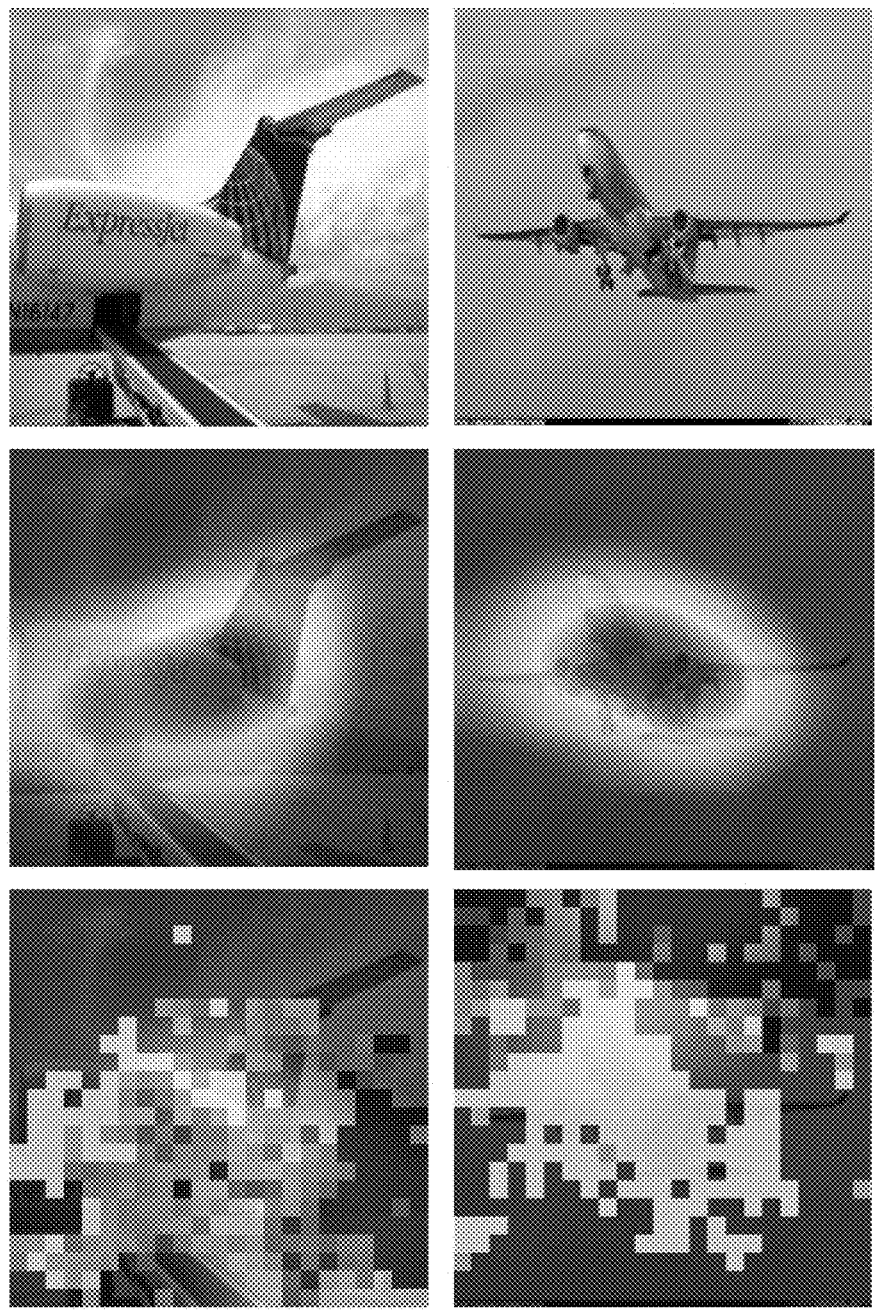
FIG. 5B depicts further visualizations generated using an illustrative embodiment of the invention for the airliner-to-seashore adversarial attack of FIG. 4.

In addition to the network level analysis discussed in the present application, Xu also analyzes adversarial examples at the pixel level using a promotion-suppression ratio (PSR), and at the image level using a class activation map (CAM). Further aspects of CAM are described in, e.g., Zhou et al., "Learning Deep Features for Discriminative Localization", 2016 IEEE Conference on Computer Vision and Pattern Recognition (CVPR), June 2016, pp. 2921-2929, the entirety of which is incorporated by reference herein for all purposes. FIGS. 5A and 5B connect images in FIGS. 3 and 4 to PSR and CAM based visual explanations.

FIG. 5A depicts further visualizations generated using an illustrative embodiment of the invention for the lamp-to-couch adversarial attack discussed above with reference to FIG. 3. The top-left image in FIG. 5A is an adversarial image corresponding to the lower-left image in FIG. 3D, and the top-right image in FIG. 5A is an adversarial corresponding to the lower-right image in FIG. 3C and the lower-left image in FIG. 3E. The center-left image in FIG. 5A shows $F(x_0, t_0)$, and the lower-left image in FIG. 5A shows $F(x', t)$ with overlaid PSR, corresponding to the top-left image in FIG. 5A. The center-right image in FIG. 5A shows $F(x_0, t_0)$, and the lower-right image in FIG. 5A shows $F(x', t)$ with overlaid PSR, corresponding to the top-right image in FIG. 5A.

FIG. 5B depicts further visualizations generated using an illustrative embodiment of the invention for the lamp-to-couch adversarial attack discussed above with reference to FIG. 4. The top-left image in FIG. 5B is an adversarial image corresponding to the lower-left image in FIG. 4B and the lower-left image in FIG. 4E, and the top-right image in FIG. 5B is an adversarial corresponding to the lower-right image in FIG. 3C and the lower-left image in FIG. 3E. The center-left image in FIG. 5B shows $F(x_0, t_0)$, and the lower-left image in FIG. 5B shows $F(x', t)$ with overlaid PSR, corresponding to the top-left image in FIG. 5A. The center-right image in FIG. 5B shows $F(x_0, t_0)$, and the lower-right image in FIG. 5B shows F(x', t) with overlaid PSR, corresponding to the top-right image in FIG. 5B.

In the bottom row of both FIG. 5A and FIG. 5B, for PSR, only the top 70% most significant perturbed grids ranked by $\{s_i\}$ are shown. The white/light colors represent suppression-dominated regions ($r_i$<1), and the black/dark colors represent promotion-dominated regions ($r_i$>1). The gray colors correspond to balance-dominated perturbations ($r_i \in$ [−1.1]).

In the bottom row of FIG. 5A, the suppressed image region identified by PSR with the white/light colors correspond to the interpretable activation of object concept airplane ($t_o$), and the promoted image region identified by PSR with the black/dark colors correspond to the interpretable activation of scene concept beach (t). In the bottom row of FIG. 5B, the suppressed image region identified by PSR with the white/light colors correspond to the interpretable activation of object concept lamp ($t_o$), and the promoted image region identified by PSR with the black/dark colors correspond to the interpretable activation of object concept sofa (t).

An illustrative embodiment of the present invention may also examine the internal representation of robustly trained CNNs (e.g., as described in Madry) against adversarial examples. Since the robust adversarial training (via robust optimization) is not scalable to ImageNet, it may be preferable to use the CIFAR-10 dataset (e.g., as described in Krizhevsky, "Learning Multiple Layers of Features from Tiny Images", April 2009, 60 pages, the entirety of which is incorporated by reference herein for all purposes) in the absence of network dissection.

Figure 6:
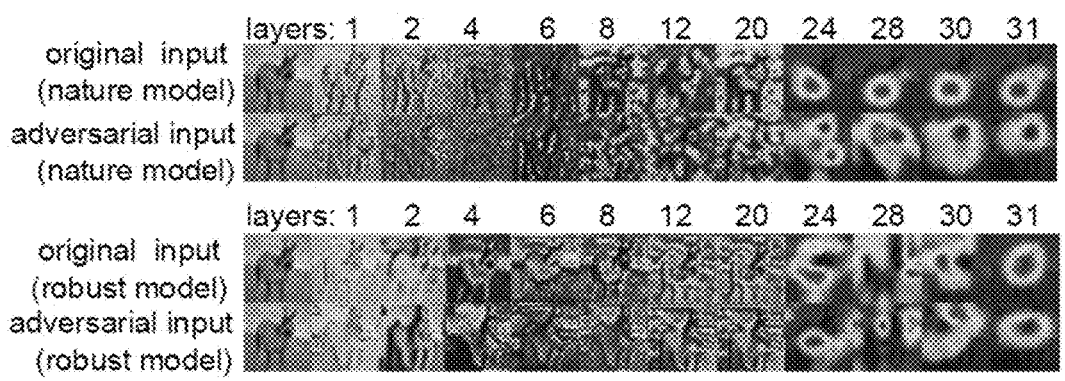
FIG. 6 depicts exemplary visualizations generated using an illustrative embodiment of the invention for selected layers of natural and robust models against a natural image and a corresponding untargeted adversarial image.
Figure 7A:
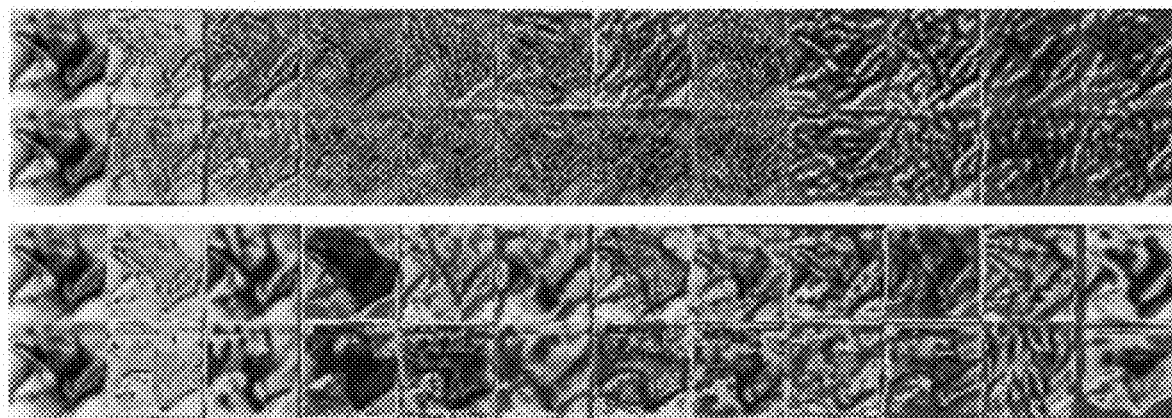
FIGS. 7A-7D depict exemplary visualizations generated using an illustrative embodiment of the invention for the first 11 layers with respect to original and adversarial images under natural and robust models.
Figure 7B:
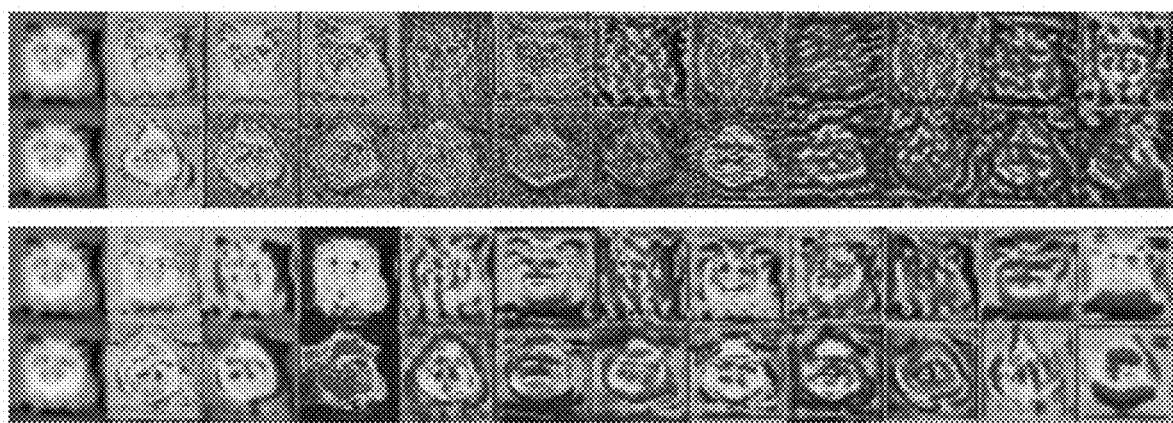
Figure 7C:
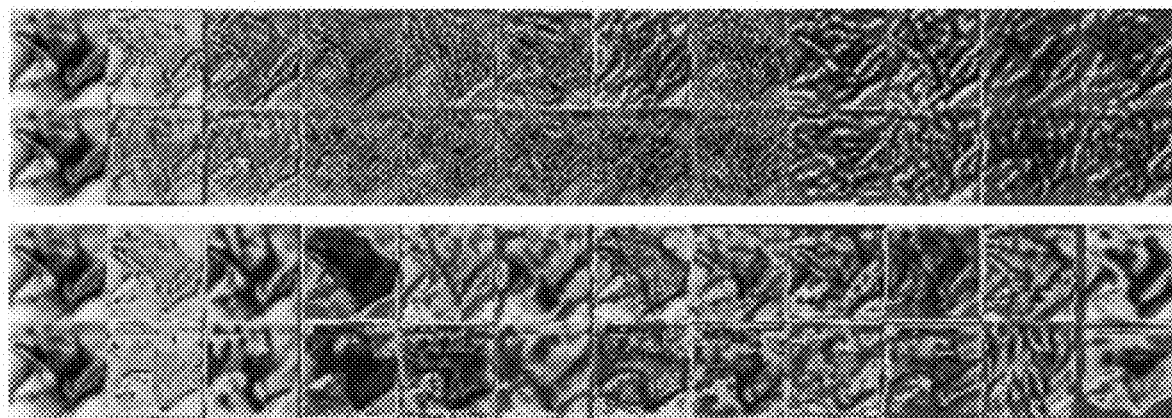
Figure 7D:
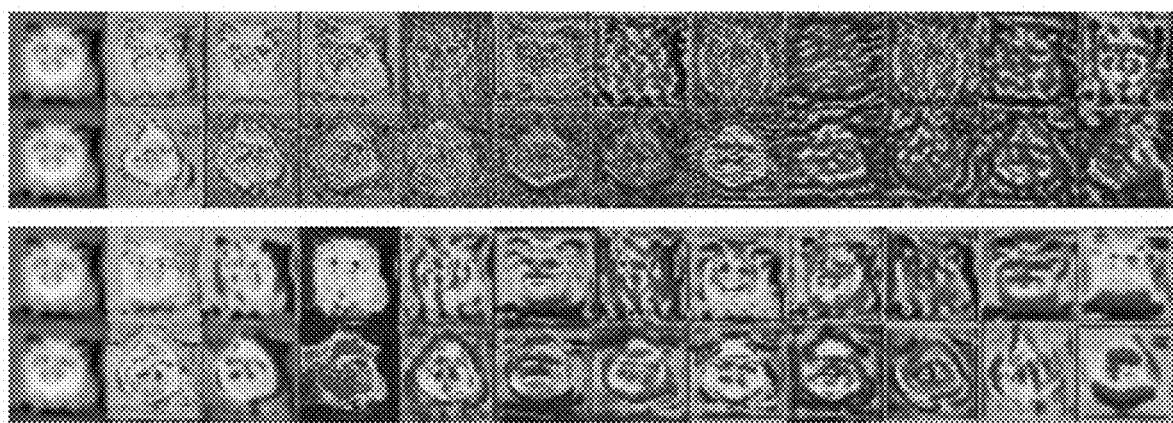

FIG. 6 depicts exemplary visualizations generated using an illustrative embodiment of the invention for selected layers of natural and robust models against a natural image and a corresponding untargeted adversarial image. More particularly, FIG. 6 shows the activation map of natural and robustly trained ResNet_18 against natural and adversarial examples. The leftmost image in the first row shows the original input (a natural image with the true label to "deer" using a natural model) and the leftmost image in the second row shows a corresponding adversarial input (untargeted adversarial image) using the natural model. The leftmost image in the third row shows the original input (a natural image with the true label to "deer" using a robust model), and the leftmost image in the fourth row shows a corresponding adversarial input (untargeted adversarial image) using the robust model.

Within the first row, to the right of the leftmost image is a series of images visualizing neurons' activations (activation maps) for layers 1, 2, 4, 6, 8, 12, 20, 24, 28, 30, and 31 against the original input shown in leftmost image of the row using the natural model. Within the second row, to the right of the leftmost image is a series of images visualizing neurons' activations (activation maps) for layers 1, 2, 4, 6, 8, 12, 20, 24, 28, 30, and 31 against the adversarial input shown in leftmost image of the row using the natural model. Within the third row, to the right of the leftmost image is a series of images visualizing neurons' activations (activation maps) for layers 1, 2, 4, 6, 8, 12, 20, 24, 28, 30, and 31 against the original input shown in leftmost image of the row using the robust model. Within the fourth row, to the right of the leftmost image is a series of images visualizing neurons' activations (activation maps) for layers 1, 2, 4, 6, 8, 12, 20, 24, 28, 30, and 31 against the adversarial input shown in leftmost image of the row using the robust model. As shown in FIG. 6, the robust training introduces a model-based correction so that the internal response tends to remain finer local features of the input image at the first 20 layers.

FIGS. 7A-7D depict exemplary visualizations generated using an illustrative embodiment of the invention for the first 11 layers with respect to original and adversarial images under natural and robust models. More particularly, FIGS. 7A-7D visualize the internal presentations of natural and robust ResNet_18 models against original and adversarial inputs. In each of FIGS. 7A-7D, the first row corresponds to response of the natural model with respect to the original image, the second row corresponds to response of the natural model with respect to the adversarial image, the third row corresponds to response of the robust model with respect to the original image, and the fourth row corresponds to response of the robust model with respect to the original image. The leftmost image in each row shows the original or adversarial image, while the remaining 11 images in each row show the response with respect to the leftmost image for the first 11 layers.

Figure 8A:
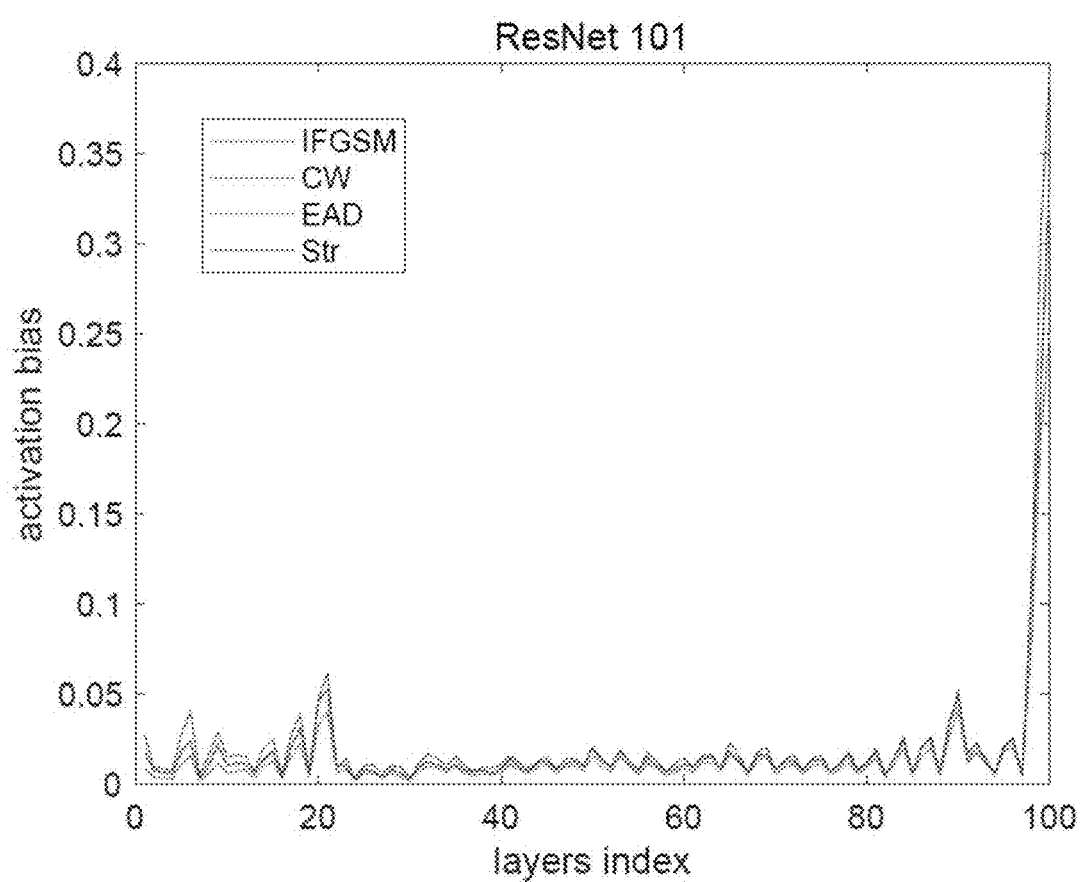
FIG. 8A is a graph depicting experimental results generated using an illustrative embodiment of the invention, specifically activation bias from different layers between original inputs and adversarial inputs under ResNet_101 model.
Figure 8B:
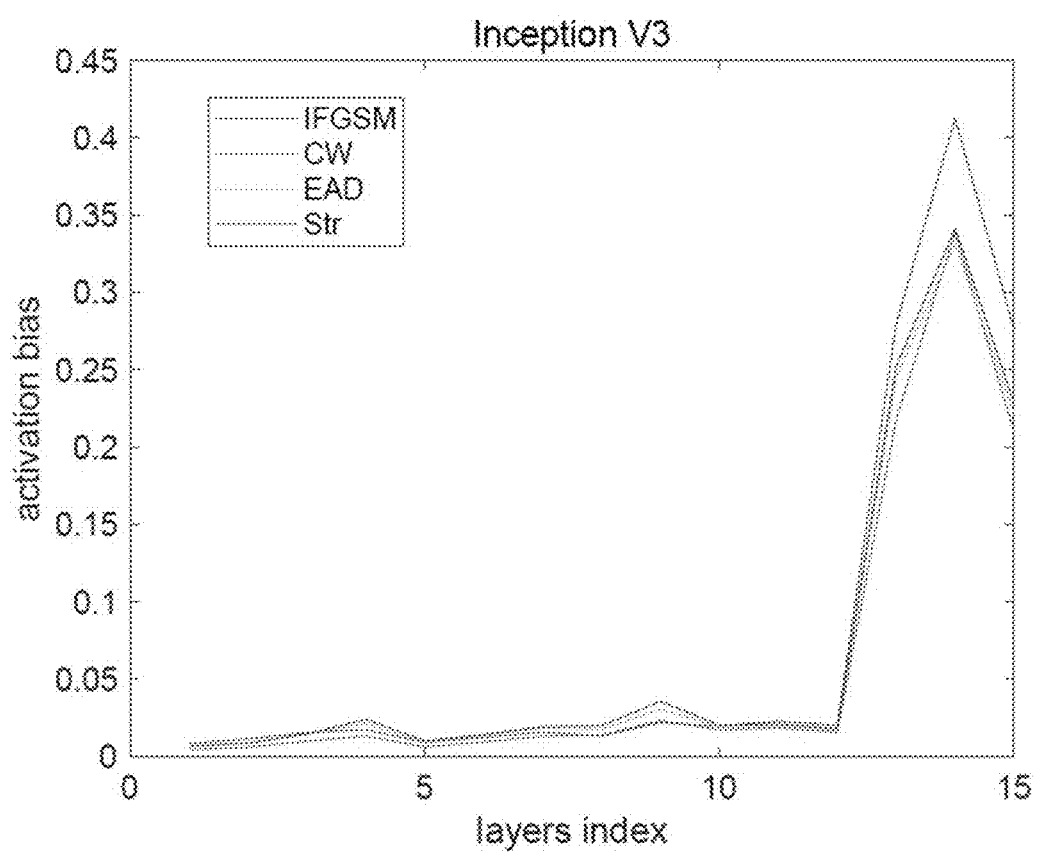
FIG. 8B is a graph depicting experimental results generated using an illustrative embodiment of the invention, specifically activation bias from different layers between original inputs and adversarial inputs under Inception_V3 model.

FIG. 8A is a graph depicting experimental results generated using an illustrative embodiment of the invention, specifically activation bias from different layers between original inputs and adversarial inputs under ResNet_101 model. FIG. 8B is a graph depicting experimental results generated using an illustrative embodiment of the invention, specifically activation bias from different layers between original inputs and adversarial inputs under Inception_V3 model. FIGS. 8A and 8B each show the activation bias achieved by four attack methods (IFGSM, C&W, EAD, and Str, all discussed above) over 5000 images in the ImageNet database. The activation bias is defined by the Euclidean between neurons' activations with respect to the original and the adversarial inputs. As shown in FIGS. 8A and 8B, the internal response of the network of the network exhibits a sharp transition towards misclassification at deep layers. This is explainable from concept-level interpretability: deeper layers involve detectors of higher-level concepts that play a crucial role on the final classification.

Returning to FIG. 1, step 150 includes neuron masking to mitigate the effect of adversaries. Step 150 de-activates the most sensitive & interpretable units, and then outputs a correct prediction 155. More particularly, using network dissection, one could mitigate the effect of adversaries by masking the most sensitive neurons with interpretation toward target labels.

The following table shows experimental results for an illustrative embodiment of the invention. More particularly, the table shows the averaged attack success rate (ASR) and the natural accuracy from attacking 1000 randomly selected images for 100 target labels over 10 trials under three masking settings: (a) masking over top 5 sensitive and interpretable units according to an illustrative embodiment of the present invention, (b) random masking, and (c) no masking. Compared to the other masking methods, the illustrative embodiment of the present invention achieves much lower ASR (e.g., much stronger defense against adversarial attacks), with only a slight degradation of natural accuracy.

| Masking setting | Averaged ASR | Natural accuracy |
|---|---|---|
| a) Top-five | 74.2% | 74.9% |
| b) Random | 91.4% | 76.7% |
| c) No masking | 100% | 77.1% |

One or more embodiments of the invention, or elements thereof, can be implemented, at least in part, in the form of an apparatus including a memory and at least one processor that is coupled to the memory and operative to perform exemplary method steps.

Figure 9:
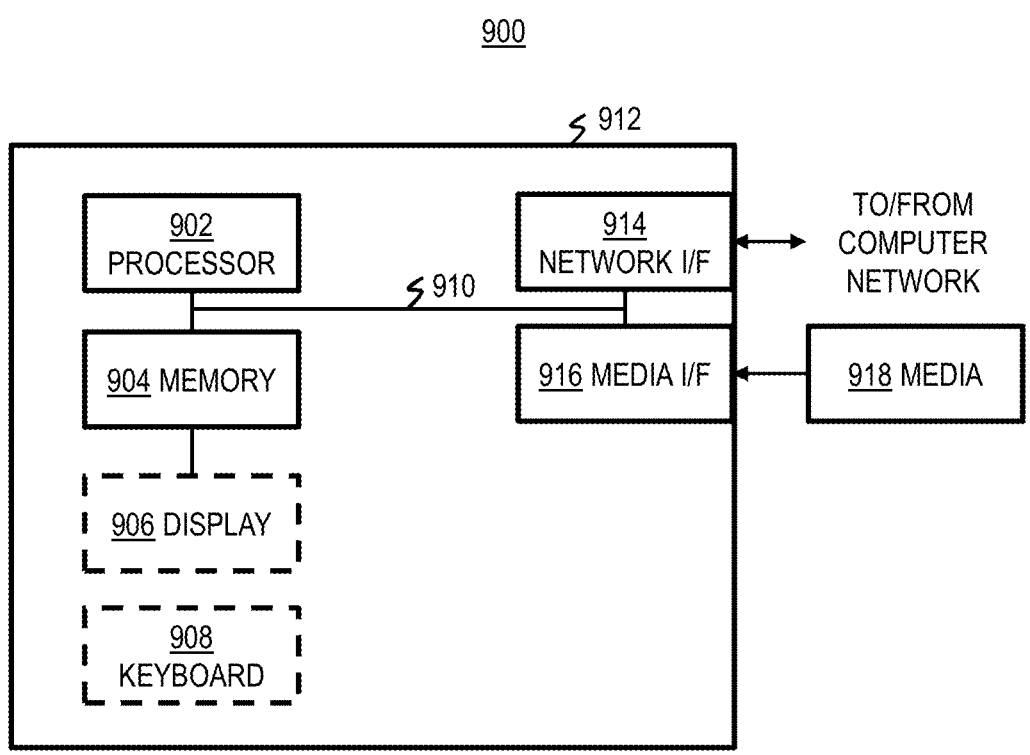
FIG. 9 shows a computer system that may be useful in implementing one or more aspects and/or elements of the invention.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 902. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for protecting a machine learning model, the method comprising:
   determining concept-level interpretability of respective units within the model;
   determining sensitivity of the respective units within the model to an adversarial attack;
   identifying units within the model which are both interpretable and sensitive to the adversarial attack; and
   enhancing defense against the adversarial attack by masking at least a portion of the units identified as both interpretable and sensitive to the adversarial attack.

2. The method of claim 1, wherein determining sensitivity of a given unit within the respective units of the model comprises determining a difference between a binary activation segmentation map of the given unit for an original input and a binary activation segmentation map of the given unit for an adversarial input generated by modifying the original input in accordance with the adversarial attack.

3. The method of claim 1, wherein determining sensitivity of a given unit within the respective units of the model comprises determining an L2-norm of a difference between a binary activation segmentation map of the given unit for an original input and a binary activation segmentation map of the given unit for an adversarial input generated by modifying the original input in accordance with the adversarial attack.

4. The method of claim 1, wherein determining the concept-level interpretability of the respective units within the model comprises contrasting respective interpretabilities of a specified number of units having highest-ranked sensitivities within the model with distribution of interpretabilities for the specified number of units randomly selected within the model.

5. The method of claim 4, wherein determining the concept-level interpretability of the respective units within the model comprises computing a probability of observing interpretability for a given unit within a specified number of units having highest-ranked sensitivities within the model in a background interpretability distribution of the specified number of units randomly selected within the model.

6. The method of claim 1, wherein identifying the units comprises outputting a unit index and attention map with respect to an interpretable concept under an original input or an adversarial input generated by modifying the original input in accordance with the adversarial attack.

7. The method of claim 1, wherein the masking comprises masking a specified number of units having highest-ranked sensitivities and interpretabilities.

8. The method of claim 7, wherein the specified number is 5.

9. The method of claim 1, wherein the enhanced defense comprises a significant reduction in an average success rate of the adversarial attack without a significant reduction in natural accuracy of the model.

10. The method of claim 1, wherein the adversarial attack comprises a norm-ball constrained adversarial attack.

11. The method of claim 1, wherein the sensitive units within the model comprise units within the model with a sensitivity above a specified threshold.

12. The method of claim 1, wherein the sensitive units within the model comprise a specified number of units within the model with highest-ranked sensitivities of units within the model.

13. The method of claim 1, wherein the adversarial attack comprises modifying an original input to generate an adversarial input, wherein the machine learning model accurately classifies the original input but does not accurately classify at least the adversarial input.

14. The method of claim 1, wherein determining the concept-level interpretability of sensitive units within the model comprises determining the interpretability of a given unit within the respective units at least in part by:
  determining an interpretability of the given unit for respective concepts within a set of concept labels; and
  determining the interpretability of the given unit at least in part by dividing a sum of the interpretability of the given unit for the respective concepts within the set of concept labels by a count of the respective concepts within the set of concept labels.

15. The method of claim 14, wherein the interpretability of the given unit for a given concept within the set of concept labels is a function of:
  a binary activation segmentation map of the given unit with respect to at least a given input value; and
  an input-resolution annotation mask for the given concept with respect to at least the given input value.

16. The method of claim 15, wherein the interpretability of the given unit for a given concept within the set of concept labels is a function of:
  a cardinality of an intersection of the binary activation segmentation map of the given unit and the input-resolution annotation mask for the given concept; and
  a cardinality of a union of the binary activation segmentation map of the given unit and the input-resolution annotation mask for the given concept.

17. The method of claim 14, wherein determining the interpretability of the given unit for a given concept within the set of concept labels comprises dividing:
  a sum of respective cardinalities, for each given input value within a dataset, of an intersection of:
    a binary segmentation map of the given unit with respect to the given input value; and
    an input-resolution annotation mask for the given concept with respect to the given input value; and
  a sum of respective cardinalities, for each given input value within the dataset, of a union of:
    the binary segmentation map of the given unit with respect to the given input value; and
    the input-resolution annotation mask for the given concept with respect to the given input value.

18. The method of claim 17, wherein the dataset comprises a Broden dataset.

19. An apparatus for protecting a machine learning model, comprising:
  a memory; and
  at least one processor coupled to the memory, the processor being operative:
    to determine concept-level interpretability of respective units within the model;
    to determine sensitivity of the respective units within the model to an adversarial attack;
    to identify units within the model which are both interpretable and sensitive to the adversarial attack; and
    to enhance defense against the adversarial attack by masking at least a portion of the units identified as both interpretable and sensitive to the adversarial attack.

20. A computer program product comprising a non-transitory machine-readable storage medium having machine-readable program code embodied therewith, said machine-readable program code comprising machine-readable program code configured:
  to determine concept-level interpretability of respective units within the model;
  to determine sensitivity of the respective units within the model to an adversarial attack;
  to identify units within the model which are both interpretable and sensitive to the adversarial attack; and
  to enhance defense against the adversarial attack by masking at least a portion of the units identified as both interpretable and sensitive to the adversarial attack.

* * * * *